(12) United States Patent
Kotani (10) Patent No.: US 6,172,350 B1
(45) Date of Patent: Jan. 9, 2001

(54) OPTICAL HEAD AND AN OPTICAL INFORMATION READING METHOD APPLIED THEREIN

(75) Inventor: Takumi Kotani, Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/182,049

(22) Filed: Oct. 29, 1998

(30) Foreign Application Priority Data

Oct. 30, 1997 (JP) .................................................. 9-298650

(51) Int. Cl.[7] .................................................. G02B 7/04
(52) U.S. Cl. .................................. 250/201.5; 250/201.2; 369/44.14
(58) Field of Search .................................. 250/201.5, 201.2, 250/216; 369/44.14, 44.23, 44.32, 44.22; 359/15, 30, 31, 32

(56) References Cited

U.S. PATENT DOCUMENTS 4,929,823  5/1990  Kato et al. .................. 250/201.5

FOREIGN PATENT DOCUMENTS 59-160166  9/1984  (JP) .
62-248144  10/1987  (JP) .
8-77578  3/1996  (JP) .

OTHER PUBLICATIONS

Imanaka et al., "Optical Disk System for Multimedia", National Technical Report, vol. 40, No. 6, pp. 771–778, Dec. 1994.

*Primary Examiner*—Que T. Le
(74) *Attorney, Agent, or Firm*—McGinn & Gibb, PLLC (57) ABSTRACT

To provide an optical head wherein no collimate lens nor object lens is used and photo-detection can be made with more than one reflection beams, the optical head has an optical system (101) comprising a collimate hologram (104) working as a collimate lens, an object hologram (105) working as an object lens, a two-portion Leith-type ring-band-plate hologram (106) for converting plane-wave light from the object hologram (105) into spherical-wave light converging on a pair of photo-detectors (107 and 108). The two-portion Leith-type ring-band-plate hologram (106) has two symmetrical portions each having a carrier component symmetrical to each other and each diffracting the plane-wave light into a part of the spherical light converging on a position which is shifted from a center line of respective one of the two symmetrical portions by a carrier angle of the respective one.

10 Claims, 7 Drawing Sheets

OPTICAL HEAD AND AN OPTICAL INFORMATION READING METHOD APPLIED THEREIN

BACKGROUND OF THE INVENTION

The present invention relates to an optical disk device, and particularly to an optical head of the optical disk device making use of holograms and an optical information reading method applied in the optical head.

Along with progress of high-density and large-capacity technology of memory devices, narrower tracks and finer pits are pursued in optical disks. For enabling the finer pit size, technical improvement of the optical head performance such as converging performance for irradiating a micro-spot, fine focusing control, accurate tracking servo or high sensitivity to the pit signal is indispensable. For realizing the high performance and the miniaturization as well of the optical head, application of the hologram to the optical head has been earnestly studied.

Figure 6:
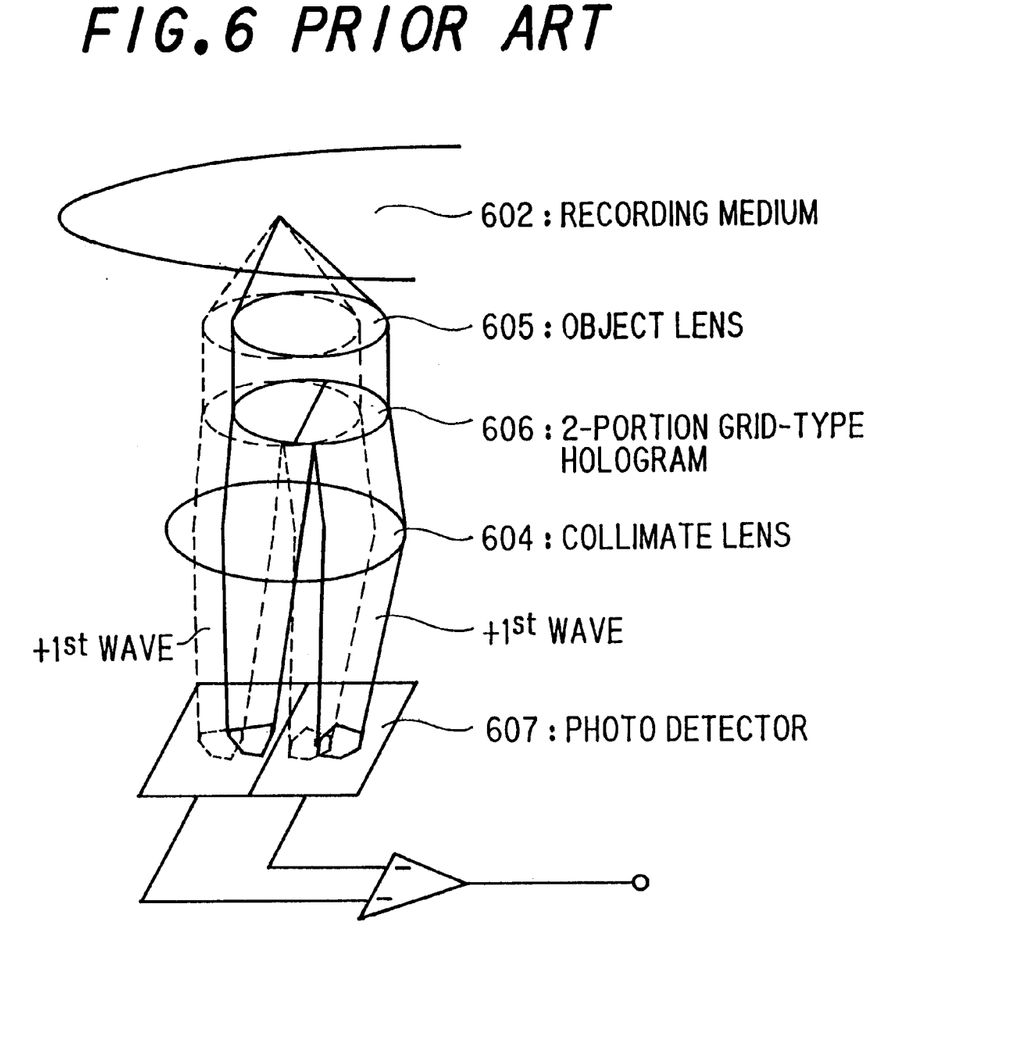
FIG. 6 is a perspective view schematically illustrating an optical head according to a first prior art.

FIG. 6 is a perspective view schematically illustrating an optical head making use of a hologram which is described in "Optical Disk System for Multimedia", by Imanaka et al., National Technical Report, Vol. 40, No. 6, pp. 771–778, December 1994, (hereinafter called the first prior art). In the first prior art of FIG. 6, a laser light which is reflected by a recording medium 602 and made parallel through an object lens 605, is divided into two beams by a two-portion grid-type hologram 606 and converged by a collimate lens 604. The converged two beams of $+1^{st}$ order waves are detected by a pair of photo-detectors 607 to be processed by a signal processor. This is a typical example of a CFT (Correct Far-field Tracking) hologram head.

Figure 7:
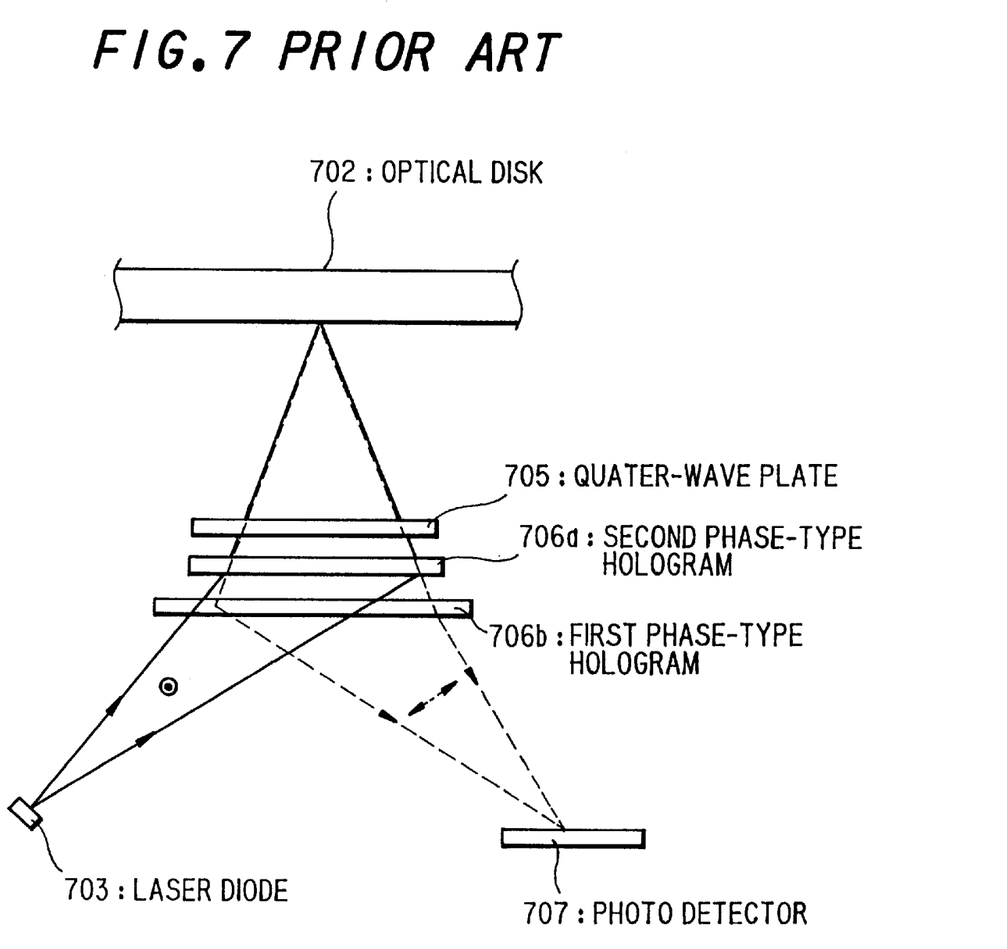
FIG. 7 is a side view illustrating another prior art example of the hologram head.

FIG. 7 is a side view illustrating another prior art example of the hologram head, which is disclosed in a Japanese patent application laid open as a Provisional Publication No. 248144/'87 (hereinafter called the second prior art). For miniaturizing and lightening optical pickup-mechanism, the collimate lens and the object lens are replaced with phase-type holograms, whereby an incident laser light is diffracted and converged on a recording medium, in the second prior art.

Referring to FIG. 7, a laser diode 703 generates a laser light S-polarized having an oscillation plane perpendicular to the drawing sheet, which penetrates a first phase-type hologram 706b being incident with a non-Bragg angle, and diffracted by a second phase-type hologram 706a having interference fringes perpendicular to the sheet to be converged on an optical disk 702. Between the second phase type hologram 706a and the optical disk 702, there is provided a quarter-wavelength plate 705, which makes circularly-polarized the laser light to be converged on the optical disk 702, and makes P-polarized the laser light reflected by the optical disk 702 to have an oscillation plane parallel to the sheet, so that the reflected laser light penetrates the second phase-type hologram 706a and is diffracted by the first phase-type hologram 706b being incident with a Bragg angle to be converged on a photo-detector 707.

In order to miniaturizing the optical head, the size of its optical system, that is, the light-path length between the light source or the photo-detector and the recording medium should be reduced. However, the reduction of the light-path length is limited in the first prior art of FIG. 6, because the collimate lens and the object lens inserting the hologram between them should be arranged at a certain distance to the light source and the photo-detector adjoining with each other.

For miniaturizing and thinning the optical system, the collimate lens and the object lens are replaced with holograms in the second prior art of FIG. 7. However, the second prior art requires high precision phase-type holograms minutely arranged, considering complex polarization components of the holograms whereon the laser light is incident with the Bragg angle. Further, the complexity of the diffraction efficiency may cause output instability of the optical head.

Still further, the servomechanism of the second prior art depends on photo-detection of a single reflection beam. Therefore, the focusing and tracking accuracy should be degraded compared to ordinary servomechanism wherein the reflection beam is split into two beams for improving detection accuracy.

SUMMARY OF THE INVENTION

Therefore, a primary object of the present invention is to provide an optical head and an optical information reading method wherein no collimate lens nor object lens is used and photo-detection can be made with more than one reflection beams, for enabling further miniaturization of the optical head without degrading focusing and tracking precision or output stability.

In order to achieve the object, an optical head of the invention has an optical system comprising:

a light source for generating a laser light;

a collimate hologram working as a collimate lens for converting the laser light into first plane-wave light;

an object hologram working as an object lens for converting the first plane-wave light into first spherical-wave light converging on a recording medium and converting the first spherical-wave light reflected from the recording medium into second plane-wave light; and a splitting hologram for converting the second plane-wave light into second spherical-wave light converging on a photo-detecting means.

The splitting hologram has preferably two symmetrical portions each having a carrier component symmetrical to each other and each diffracting the second plane-wave light into a part of the second spherical-wave light converging on a position which is shifted from a center line of respective one of the two symmetrical portions by a carrier angle of the respective one.

Therefore, the photo-detecting means can be arranged apart from two optical centers of the splitting hologram by the carrier angles, without needing collimate lenses for the photo-detection, which gives larger freedom in the arrangement of the optical system compared to the prior art of FIG. 6, enabling to shorten the light-path length from the light source and the collimate hologram to the splitting hologram. Hence, further down-sizing of the optical head can be realized.

The photo-detecting means preferably comprises a first and a second photo-detector each having two detection regions, for enabling the focusing of the optical system to be controlled by the servo controller according to a double-knife-edge method so that a sum of a difference of light intensity between the two detection regions of the first photo-detector and that of the second photo-detector becomes zero, and enabling the tracking of the optical system to be controlled by the servo controller according to a push-pull method so that a difference between a sum of light intensity of the two detection regions of the first photo-detector and that of the second photo-detector becomes zero.

Therefore, more accurate and robust focusing control is enabled against shift of the photo-detectors which may be caused along with long time usage.

As to each of the two symmetrical portions of the splitting hologram, a Leith-type ring-band-plate hologram, which can be fabricated by giving a carrier component to a Gabor-type ring-band-plate hologram, can be employed.

The collimate hologram, the object hologram or the splitting hologram may be an amplitude hologram, a phase-type hologram or a phase-type volume hologram.

Furthermore, the splitting hologram may have four symmetrical portions each having a carrier component symmetrical to each other and each diffracting the second plane-wave light into a part of the second spherical-wave light converging on a position which is shifted from a center line of respective one of the four symmetrical portions by a carrier angle of the respective one.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
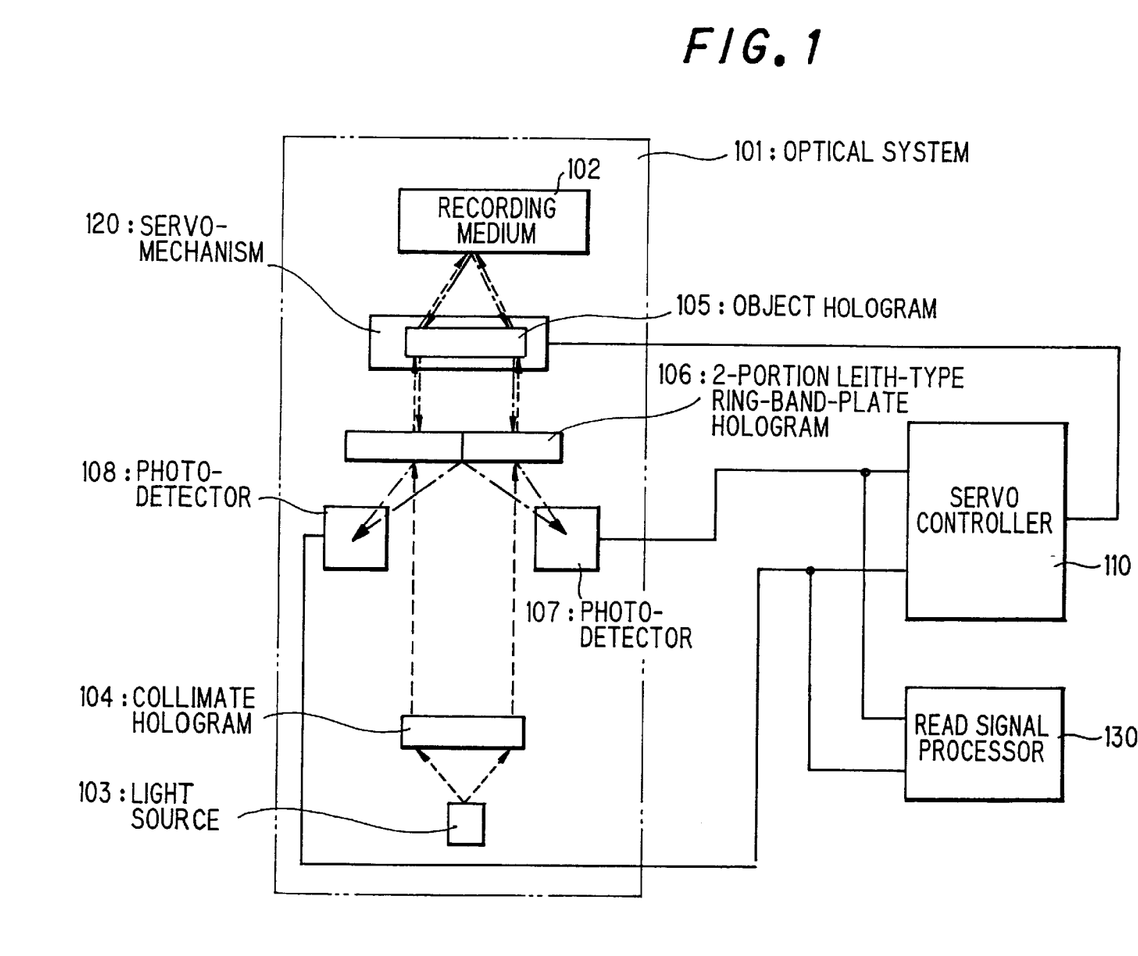
FIG. 1 is a block diagram schematically illustrating a configuration of an optical head according to an embodiment of the invention.

FIG. 1 is a block diagram schematically illustrating a configuration of an optical head according to an embodiment of the invention, having an optical system 101 comprising a recording medium 102, a light source 103, a collimate lens 104, an object hologram 105, a two-portion Leith-type ring-band-plate hologram 106, a pair of photo-detectors 107 and 108, and a servomechanism 120, together with a servo controller 110, and a read signal processor 130.

The light source 103 generates a laser light to be irradiated to a recording medium 102 such as an optical disk, which is made parallel through the collimate hologram 104. The laser light passing through the two-portion Leith-type ring-band-plate hologram 106 is converged on the recording medium 102 by the object hologram 105. The laser light reflected by the recording medium 102 is again made parallel through the object hologram 105 and split into two beams each having spherical wave fronts converging on each of the pair of photo-detectors 107 and 108 by the two-portion Leith-type ring-band-plate hologram 106. The servo controller 110 controls the servomechanism 120 of the object hologram 105 according to electric signals detected by the pair of photo-detectors 107 and 108. The read signal processor 130 generates a reproduction signal to be output from the electric signals detected by the pair of photo-detectors 107 and 108.

Now, an example of a fabrication method of the two-portion Leith-type ring-band-plate hologram 106, which is a most characteristic part of the invention, will be described referring to a schematic diagram of FIG. 2.

Figure 2:
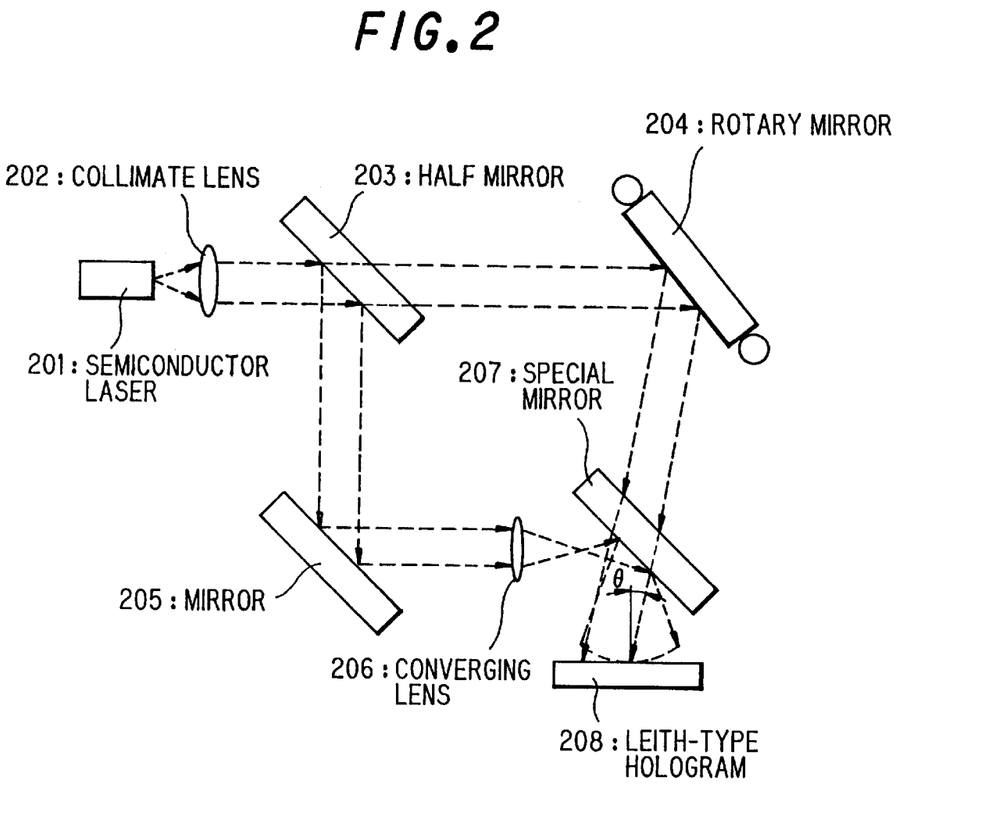
FIG. 2 is a schematic diagram illustrating a fabrication method of the two-portion Leith-type ring-band-plate hologram 106 of FIG. 1.

In FIG. 2, there are depicted a semiconductor laser 201, a collimate lens 202, a half-mirror 203, a rotary mirror 204, a mirror 205, a converging lens 206, a special mirror 207 and a Leith-type hologram 208 to be fabricated.

The optical system of FIG. 2 consists of a kind of Mach-Zender optical system. A laser light having spherical wave fronts, which is generated by the semiconductor laser 201, is made parallel through the collimate lens 202, whereof a part penetrating through the half-mirror 203 is reflected by the rotary mirror 204 and projected on the 5 Leith-type hologram 208 to be fabricated with a projection angle θ passing through the special mirror 207.

On the other hand, the other part of the laser light, which is made parallel through the collimate lens 202 and reflected by the half-mirror 203, is reflected by the mirror 205 and again converged through the converging lens 206 into a beam having spherical wave fronts to be projected on the Leith-type hologram 208 to be fabricated after reflected by the special mirror 207.

The plane wave passing through the special mirror 207 being represented by u(x, y), and the spherical wave reflected by the special mirror 207 being represented by h(x, y), following equations stand, (x, y) denoting coordinates of a point on the surface of the Leith-type hologram 208 to be fabricated, whereof optical center being the origin.

$$u(x, y) = Au \cdot \exp\{-j2\pi x \sin \theta/\lambda\} \quad (1)$$

$$h(x, y) = Ah \cdot \exp\{-j\pi \rho^2/(\lambda f)\} \quad (2)$$

Here, Au and Ah denote respective light intensities of the plane wave and the spherical wave, θ denotes the projection angle of the plane wave relative to the normal line of the Leith-type hologram 208 to be fabricated, $f$ denotes focal distance of the converging lens 206, λ denotes a wave length of the laser light, and $\rho^2 = x^2 + y^2$.

The intensity distribution I(x, y) obtained from interference between the plane wave and the spherical wave is represented as follows:

$$I(x, y) = |u(x, y) + h(x, y)|^2. \quad (3)$$

By substituting equations (1) and (2) into equation (3), intensity distribution I(x, y) of the hologram, that is, the intensity distribution of the Leith-type ring-band-plate hologram 208 is expressed as follows;

$$I(x, y) = Au^2 + Ah^2 + 2Au \cdot Ah \cos(2\pi x \sin \theta/\lambda - \pi \rho^2/(\lambda f)) \quad (4)$$

Normalizing the maximum value of the intensity distribution I(x, y) as 1 and expressing the carrier component as α(x, θ), equation (4) is simplified as follows.

$$I(x, y) = \frac{1}{2}\left\{1 + \cos\left(\alpha(x, \theta) - \frac{\pi\rho^2}{\lambda f}\right)\right\} \quad (5)$$

When the projection angle θ is set as 0° by adjusting the rotary mirror 204, the carrier component α(x, θ) of equation (5) becomes zero and a hologram working as a convex lens having an optical axis passing through the origin, that is, a Gabor-type ring-band-plate hologram can be fabricated, which is to be used as the object hologram 105 and the collimate hologram 104 of FIG. 1.

Now, operation of the optical head according to the embodiment is described.

Referring to FIG. 1, a diffusing spherical wave is output from the light source 103 and made parallel through the collimate hologram 104, which penetrates the two-portion Leith-type ring-band-plate hologram 106 and is converged by the object hologram 105 on the recording medium 102. The spherical wave reflected by the recording medium 102 is again made parallel by the object hologram 105, and split into two directions by the two-portion Leith-type ring-band-plate hologram 106, whereof each is converged at the same time onto respective one of the pair of photo-detectors 107 and 108.

The servo controller 110 controls the servomechanism 120 according to electric outputs of the pair of photo-detectors 107 and 108, so that tracking and focusing of the object hologram 105 are feedback controlled.

The read signal processor 130 generates the output signal by processing additional signals of the electric outputs of the pair of photo-detectors 107 and 108.

Figure 3:
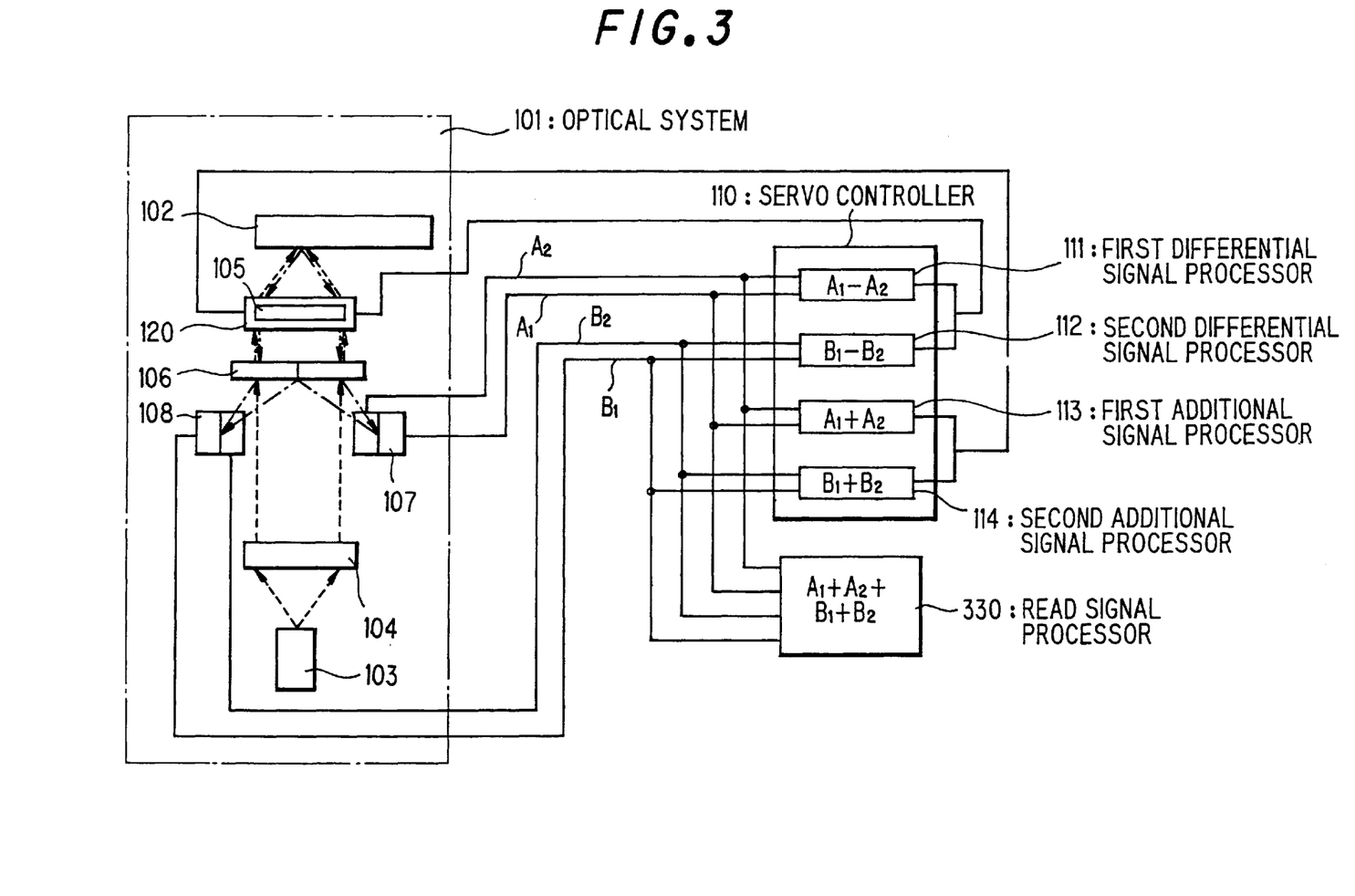
FIG. 3 is a functional block diagram for illustrating details of focusing, tracking and reproducing operation of the optical head of FIG. 1.

FIG. 3 is a functional block diagram for illustrating details of the above operation.

Referring to FIG. 3, each of the pair of photo-detectors 107 and 108 has two detection regions, and the photo-detector 107 outputs two electric signals $A_1$ and $A_2$, while the photo-detector 108 outputs two electric signals $B_1$ and $B_2$.

In the servo controller 110, there are provided;

a first differential signal processor 111 for calculating a first differential signal $A_1-A_2$, and a second differential signal processor 112 for calculating a second differential signal $B_1-B_2$, the first and the second differential signals being used for actuateing the focusing control of the servomechanism 120, and a first additional signal processor 111 for calculating a first additional signal $A_1+A_2$, and a second additional signal processor 112 for calculating a second additional signal $B_1+B_2$, the first and the second additional signals being used for actuating the tracking control of the servomechanism 120.

The read signal processor 130 calculates a sum signal $A_1+A_2+B_1+B_2$.

Figure 4:
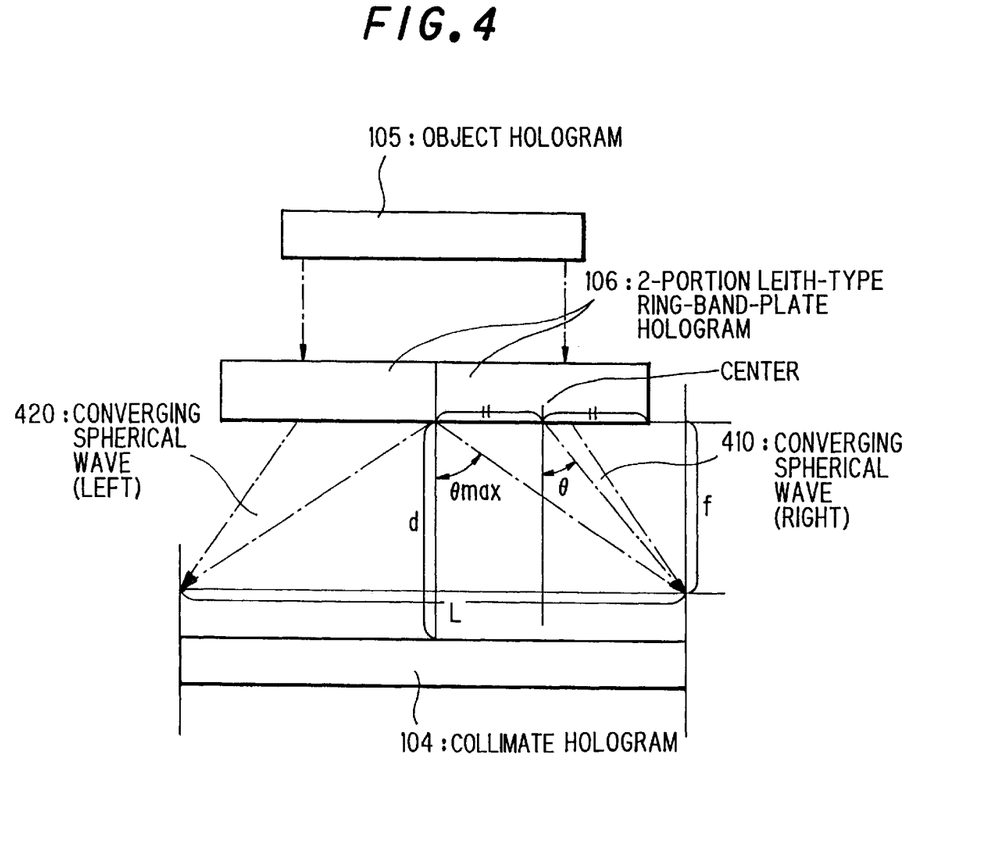
FIG. 4 is a sectional view for illustrating function of the two-portion Leith-type ring-band-plate hologram 106.

FIG. 4 is a sectional view for illustrating function of the two-portion Leith-type ring-band-plate hologram 106, wherein holograms are arranged to be applied to the optical system 101 of FIG. 3. In FIG. 4, numerals 410 and 420 denote a right-side converging spherical wave and a left-side converging spherical wave.

The two-portion Leith-type ring-band-plate hologram 106 is composed of two pieces of the Leith-type holograms 208 each fabricated according to the fabrication method described referring to FIG. 2 and put together plane-symmetrically.

Representing the plane wave returning from the object hologram 105 as v(x, y)=1, the amplitude transmittancy T(x, y) of either side (right side, for example) of the two-portion Leith-type ring-band-plate hologram 106 is expressed as follows from equation (5):

$$T(x, y) = v(x, y) \cdot I(x, y) \quad (6)$$

$$= \frac{1}{2} + \frac{1}{4}\exp\left[j\left\{\alpha(x, \theta) - \frac{\pi\rho^2}{\lambda f}\right\}\right] +$$

$$\frac{1}{4}\exp\left[-j\left\{\alpha(x, \theta) - \frac{\pi\rho^2}{\lambda f}\right\}\right].$$

Above equation (6) represents the amplitude transmittancy. Therefore, the actual diffraction efficiency becomes higher in the case of a phase-type hologram such as the two-portion Leith-type ring-band-plate hologram 106 of the embodiment. Furthermore, the transmittancy is affected from other factors such as exposure values in the fabrication process of the Leith-type ring-band holograms. However, they are omitted here for qualitative comprehension.

In equation (6), the first term represents a direct-current component having ½ amplitude, the second term represents a diffusing spherical wave with a focal distance of $-f$ having ¼ amplitude, and the third term represents a converging spherical wave with a focal distance $f$ having ¼ amplitude, namely, the right-side converging spherical wave 410 of FIG. 4, in this case. Here, the carrier angle θ of the amplitude transmittancy T(x, y) is a known parameter corresponding to the projection angle θ of FIG. 2, and corresponds here to an angle between a line from a center of either piece to its respective focusing point and the normal line of the two-portion Leith-type ring-band-plate hologram 106, as illustrated in FIG. 4.

The photo-detectors 107 and 108 of FIG. 2 are set at the two focusing points of the right-side converging spherical wave 410 and the left-side converging spherical wave 420 thus calculated.

Relation among the diameter L of the collimate hologram 104, the maximum carrier angle $\theta_{max}$, and the focal distance $f$ becomes $f=L/(2\tan\theta_{max})$. Therefore, a distance d between the two-portion Leith-type ring-band-plate hologram 106 and the collimate hologram 104 is set to satisfy a condition $d \leq L/(2\tan\theta_{max})$.

Figure 5A:
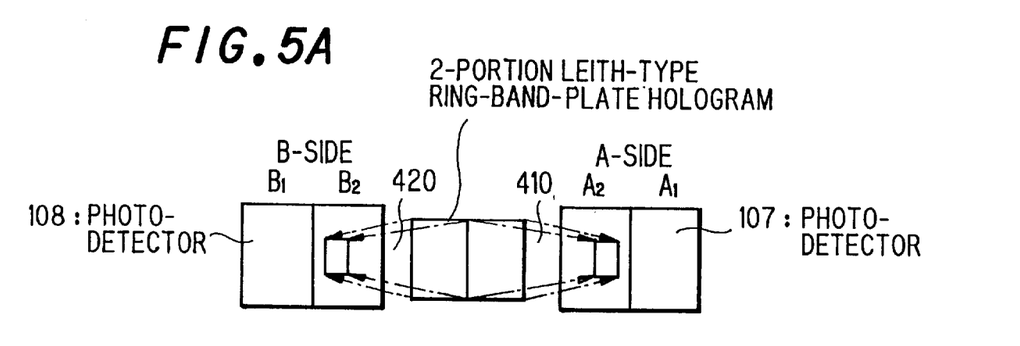
FIG. 5A is a schematic diagram illustrating a focusing pattern where the distance between the recording medium 102 and the object hologram 105 is shorter than the focal distance of the object hologram 105.
Figure 5B:
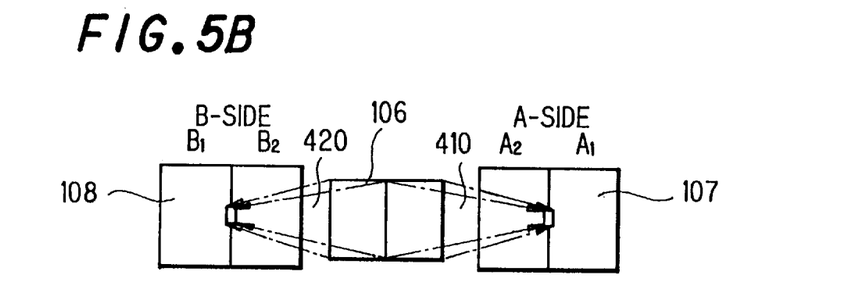
FIG. 5B is a schematic diagram illustrating another focusing pattern where the object hologram 105 is just focusing.
Figure 5C:
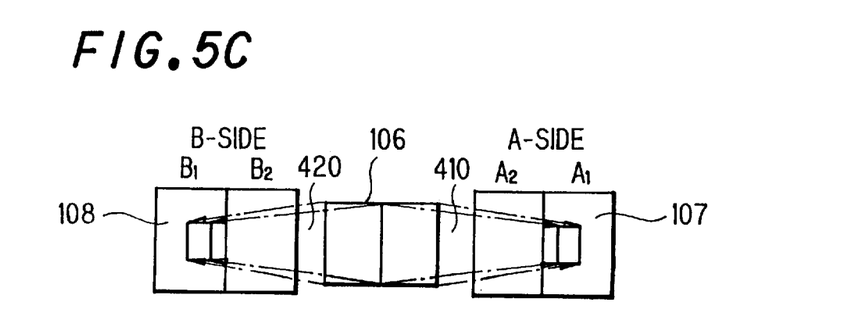
FIG. 5C is a schematic diagram illustrating still another focusing pattern where the distance between the recording medium 102 and the object hologram 105 is longer than the focal distance.

Now, photo-detection, focusing, tracking and signal reproduction are described referring to FIGS. 5A to 5C schematically illustrating three different focusing patterns.

As previously described, each of the pair of photo-detectors 107 and 108 has two detection regions for outputting the two electric signals $A_1$ and $A_2$ or $B_1$ and $B_2$. In FIGS. 5A to 5C, the corresponding detection regions are denoted with corresponding symbols $A_1$, $A_2$, and $B_1$, $B_2$.

In FIG. 5A, two beams of the right-side and the left-side converging spherical wave 410 and 420 split by the two-portion Leith-type ring-band-plate hologram 106 are both projected on inner side detection regions $A_1$ and $B_1$ of the photo-detectors 107 and 108, which means that the distance between the recording medium 102 and the object hologram 105 is shorter than the focal distance of the object hologram 105.

In FIG. 5B, both the two beams are projected on boundary lines between the detection regions $A_1$, $A_2$ and $B_1$, $B_2$, which means that the object hologram 105 is just focusing.

And, both the two beams are projected on outer detection regions $A_2$ and $B_2$ in FIG. 5C, which means that the distance between the recording medium 102 and the object hologram 105 is longer than the focal distance.

Therefore, by so controlling the object hologram 105 as to make both the first differential signal $A_1-A_2=0$ and the second differential signal $B_1-B_2=0$, the object hologram 105 can be maintained to be just focusing. Here, in the embodiment, the object hologram 105 is controlled by the servo controller 110 so that the sum of the first and the second differential signal becomes zero, as follows;

$$(A_1-A_2)+(B_1-B_2)=0. \tag{7}$$

This is a method called the double-knife-edge method which is robust against a positional shift of the pair of photo-detectors 107 and 108 derived of long time usage, since the shift of each of the photo-detectors 107 and 108 compensates each other.

As to the tracking servo, the object hologram 105 is controlled according to a push-pull method, so that the difference between the first additional signal $A_1+A_2$ and the second additional signal $B_1+B_2$ becomes zero, as follows;

$$(A_1+A_2)-(B_1+B_2)=0 \tag{8}$$

Thus, the servo controller 110 controls the focusing and the tracking by controlling relative position of the object hologram 105 to the recording medium 102 through the servomechanism 120.

The read signal processor 130 generates output signal RF representing the sum of the first and the second additional signal, according to following equation;

$$RF=(A_1+A_2+B_1+B_2). \tag{9}$$

As heretofore described., the collimate lens and the object lens are replaced with the collimate hologram 104 and the object hologram 105 in the optical system 101 of the embodiment, and the two-portion Leith-type ring-band-plate hologram 106 having converging symmetrical carrier components are employed for splitting reflected laser light to be detected. Therefore, the photo-detectors 107 and 108 can be arranged apart from the two optical centers of the two-portion Leith-type ring-band-plate hologram 106 by the carrier angles, without needing collimate lenses for the photo-detection, which gives larger freedom in the arrangement of the optical system compared to the prior art of FIG. 6, enabling to shorten the light-path length from the light source 103 and the collimate hologram 104 to the two-portion Leith-type ring-band-plate hologram 106.

Therefore, further down-sizing of the optical head can be realized according to the invention.

Furthermore, the double-knife-edge method can be applied to the focusing control in the optical head 101 according to the invention, by detecting the two converging spherical waves split by the two-portion Leith-type ring-band-plate hologram 106 making use of the pair of photo-detectors 107 and 108 each having two detection regions.

Therefore, more accurate and robust focusing control is enabled against shift of the photo-detectors which may be caused along with long time usage.

Heretofore, the present invention is described in connection with the embodiment wherein phase-type holograms are applied to every of the collimate hologram 104, the object hologram 105 and the two-portion Leith-type ring-band-plate hologram 106.

However, they may be made of phase-type volume holograms. In the phase-type volume holograms, wherein gelatin-high-polymer made photo-active with bichromate-gelatin-ammonium solution is exposed to laser light and develped being dehydrated with isopropyl alcohol to have different refractive indexes, the diffraction efficiency of more than 90 can be obtained.

They may be also made of amplitude holograms.

Still further, the two-portion Leith-type ring-band-plate hologram 106 may be divided into more portions, four portions, for example, together with more numbers of photo-detector sets, for improving reliability of the servo control.

What is claimed is:

1. An optical head, for reading information optically recorded on a recording medium, having a photo-detecting means, an optical system for projecting laser light on the recording medium and converging the laser light reflected by the recording medium on the photo-detecting means, a servo controller for controlling focusing and tracking of the optical system and a read signal processor for processing an output signal of the photo-detecting means; said optical system comprising:

a light source for generating the laser light;

a collimate hologram working as a collimate lens for converting the laser light into first plane-wave light;

an object hologram working as an object lens for converting the first plane-wave light into first spherical-wave light converging on the recording medium and converting the first spherical-wave light reflected from the recording medium into second plane-wave light; and a splitting hologram for converting the second plane-wave light into second spherical-wave light converging on the photo-detecting means.

2. An optical head as recited in claim 1; wherein the splitting hologram has two symmetrical portions each having a carrier component symmetrical to each other and each diffracting the second plane-wave light into a part of the second spherical-wave light converging on a position which is shifted from a center line of respective one of the two symmetrical portions by a carrier angle of the respective one.

3. An optical head as recited in claim 2; wherein:

the photo-detecting means comprises a first and a second photo-detector each having two detection regions; and the focusing of the optical system is controlled by the servo controller according to a double-knife-edge method so that a sum of a difference of light intensity between the two detection regions of the first photo-detector and that of the second photo-detector becomes zero.

4. An optical head as recited in claim 2; wherein:

the photo-detecting means comprises a first and a second photo-detector each having two detection regions; and the tracking of the optical system is controlled by the servo controller according to a push-pull method so that a difference between a sum of light intensity of the two detection regions of the first photo-detector and that of the second photo-detector becomes zero.

5. An optical head as recited in claim 1; wherein an amplitude hologram is employed to any of the collimate hologram, the object hologram and the splitting hologram.

6. An optical head as recited in claim 1; wherein a phase-type hologram is employed to any of the collimate hologram, the object hologram and the splitting hologram.

7. An optical head as recited in claim 1; wherein a phase-type volume hologram is employed to any of the collimate hologram, the object hologram and the splitting hologram.

8. An optical head as recited in claim 1; wherein the splitting hologram has four symmetrical portions each having a carrier component symmetrical to each other and each diffracting the second plane-wave light into a part of the second spherical-wave light converging on a position which is shifted from a center line of respective one of the four symmetrical portions by a carrier angle of the respective one.

9. An optical information reading method of reading information optically recorded on a recording medium; the optical information reading method comprising steps of:

generating a laser light;

converting the laser light into first plane-wave light making use of a collimate hologram working as a collimate lens;

converting the first plane-wave light passing through a splitting hologram into first spherical-wave light converging on the recording medium making use of an object hologram working as an object lens;

converting the first spherical-wave light reflected from the recording medium into second plane-wave light by the object hologram;

converting the second plane-wave light by the splitting hologram into second spherical-wave light converging on a photo-detecting means; and controlling focusing and tracking of the object hologram according to positional information of the second spherical-wave light converged on the photo-detecting means.

10. An optical information reading method as recited in claim 9; wherein the splitting hologram has two symmetrical portions each having a carrier component symmetrical to each other and each diffracting the second plane-wave light into a part of the second spherical-wave light converging on a position which is shifted from a center line of respective one of the two symmetrical portions by a carrier angle of the respective one.

* * * * *